July 16, 1963 — C. A. MILLS — 3,097,650
THERAPEUTIC RADIANT COOLING SYSTEM
Filed June 12, 1958
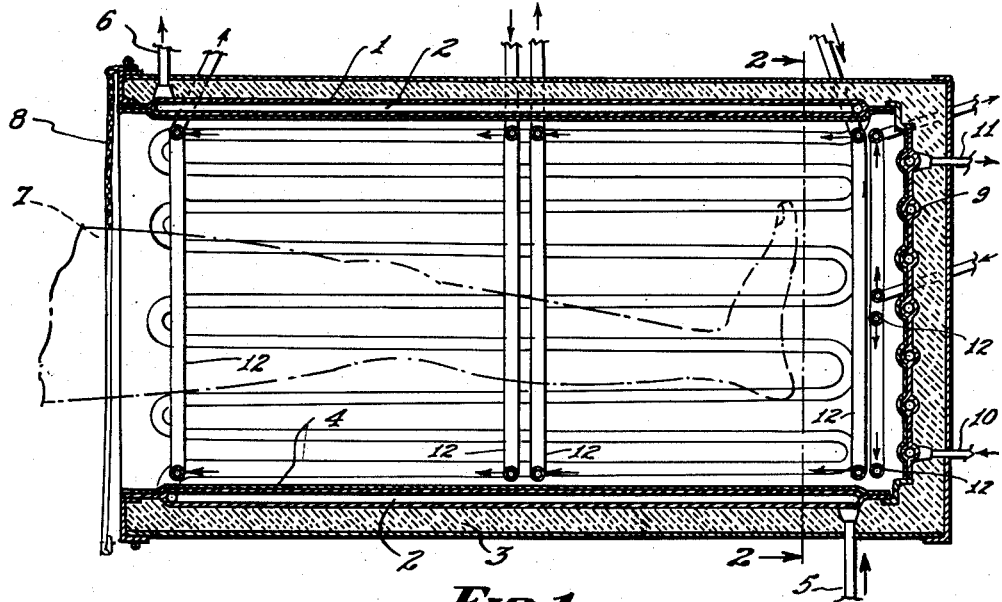
FIG.1.
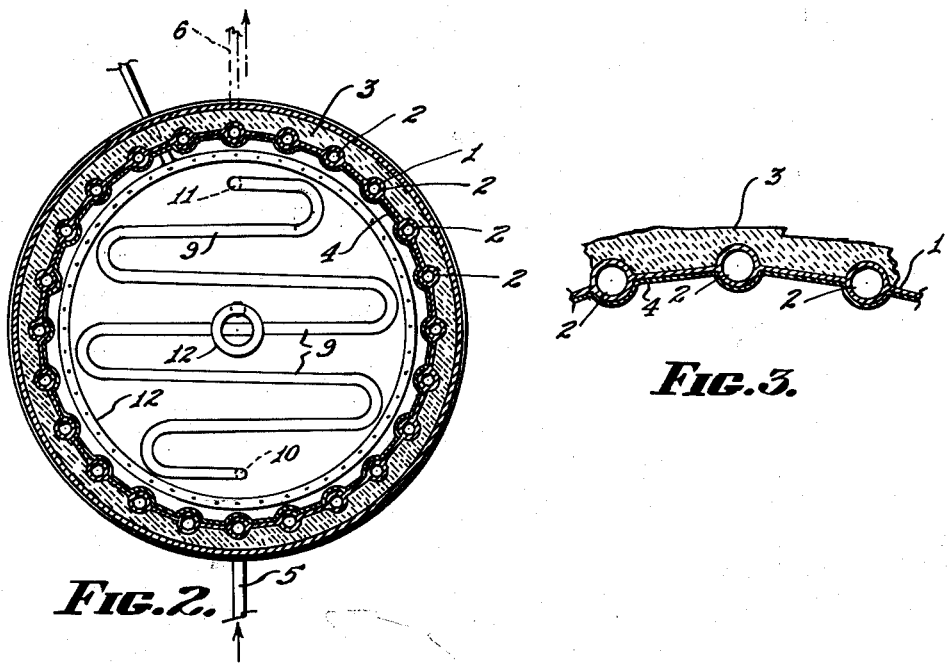
FIG.2.
FIG.3.
INVENTOR.
CLARENCE A. MILLS,
BY
ATTORNEYS.

United States Patent Office 3,097,650
Patented July 16, 1963

3,097,650
THERAPEUTIC RADIANT COOLING SYSTEM
Clarence A. Mills, Cincinnati, Ohio, assignor to Reflectotherm, Inc., Cincinnati, Ohio, a corporation of Ohio
Filed June 12, 1958, Ser. No. 741,678
1 Claim. (Cl. 128—402)

In my Patent No. 2,783,618 granted March 5, 1957, I have disclosed the effectiveness of cooling by utilizing the principle of radiant heat dissipation and absorption as effecting the cooling of confections or enrobed cookies or cakes while traveling on a conveyor.

This application is a continuation-in-part of my application Ser. 531,847 filed August 31, 1955, now abandoned, and relates to a system of heat transfer whereby the tissues of living animals including man are cooled in depth by radiant heat removal without direct contact, as contrasted to the usual methods of cooling by the direct contact of the cooling medium with the living tissue, whether it be circulating cold air, immersion in cold water or encasement in cold wetted blankets.

All living tissues produce heat throughout their substance by their energy-liberating chemical reactions and much of this heat must be dissipated off into the surroundings, since only a minor part of it is retained for regeneration or growth of the tissue itself. Even in normal health this heat dissipation must go on, with the tissue maintaining a more or less stable temperature within itself. Failure in the body's temperature-stabilizing mechanism, or excessively hot surroundings, may cause the body temperature to rise and produce damaging fever. In other instances, it may be desired to reduce tissue temperatures below normal levels in the body as a whole or in some of its parts. This is called refrigeration therapy and is much used in surgery and in many non-surgical therapeutic procedures.

My invention relates to the removal of tissue or body heat through non-contact radiant channels and has its main basis in the theoretical physics of the quantum mechanics theory as propounded and developed by the world's leading physicists during the past three decades. Its technical operation, however, depends upon the peculiar physics of the carbon atom in its amorphous state and in particular in its ability to emit or absorb infrared radiant heat wavelengths of all categories but especially those in the ultra-long wavelengths of the diathermy range of 100–400 microns.

The known tendency of carbon atoms in the amorphous state to associate in pairs, with the 4 outer active electrons of one atom pairing up with those of another (into the so-called "electron octet"), seems to be the most likely explanation for the change of state emission of the diathermy-type rays from carbon-blackened surfaces, and for their acceptance and absorption by carbon-blackened cold plates when emitted by organic materials undergoing a change of state.

Carbon-blackened metal surfaces heated to 150° F. to 450° F. have been found to be significant emitters of these same diathermy-type rays (100-400 micron wavelength) which pass freely through most plastic films or conveyor belting and produce the typical diathermy heating effect in the human tissues (the hand, for instance).

Much of the basic knowledge on radiant heat origins and emissions known to theoretical physics has not yet found its way into practical heat-transfer engineering applications. Such basic knowledge is perhaps best covered in various sections of the Encyclopedia Britannica (3) prepared by some of the world's leading theoretical physicists. In the following paragraphs is presented a general digest of these radiant heat transfer features most directly bearing on product cooling problems.

*Radiant Energy Transfer*

Molecules, atomic nuclei and electrons of all materials are in constant activity and are emitting and absorbing radiant energy even when in a stationary state of constant temperature. The intensity of such radiant emission is proportional to the fourth power of the material's Absolute temperature. In stationary states this radiant energy has three sources: (a) electron vibrations in the outer shell of the atom, (b) vibrations of the atomic nuclei, and (c) vibrations of the molecule as a whole. Radiant energy from (a) and (b) lies in the shorter infrared wavelengths (1 to 10 micron) and constitutes the major part of the total radiation, while that from (c) lies far out in the longest infrared ranges (100 to 400 micron).

When a change is made from one stationary state to another, definite additional quanta of energy are involved either in the direction of absorption or emission. Changes from solid to liquid to gaseous state involve energy absorption by the molecules, while in the reverse direction of change similar quanta of energy are emitted. Molecular re-arrangements or change in stationary state are associated with absorption or emission of radiant energy in the far infrared ranges of wavelengths (100 to 400 micron), intra-molecular re-arrangements of ions or electrons are associated with absorption or emission in the shorter infrared wavelengths (1 to 10 micron), while changes within the atom are associated with absorption or emission in the visible and ultraviolet ranges of wavelengths (0.2 to 0.8 micron). Fission or fusion reactions of atomic nuclei lead to radiant emission at the shortest wavelength end of the spectrum. Non-metallic materials (such as candies) are largely transparent to radiations of wavelengths beyond 100 micron (Hertzian waves as used in diathermy). Passage of such radiations through non-metallic materials results in the absorption of varying amounts of this radiant energy by molecules throughout the mass and in an increase of their rotational activity and temperature level.

Since radiant emissions and absorption are known to be essentially identical processes but in opposite directions, it follows that molecular activity and temperature level can be reduced by external absorption of all such far infrared (short Hertzian) radiations emitted outward through the surrounding mass which is in turn largely transparent to energy in this range of wavelength. Deep cooling of such materials is thus possible quite independent of other wavelengths of surface radiant emissions or of surface conduction-convection cooling. This includes especially the ready removal of the latent heat of change of state, as in product solidification.

Radiant transparency of organic materials such as candies is proportional to the radiant wavelength involved. Such materials absorb most radiations below 1 micron wavelength but increase in transparency as wavelengths increase. Dry human skin has been found to be 50% transparent at 10 micron wavelength (4) and only slightly absorptive at wavelengths beyond 100 micron (medical diathermy range). Conductance of heat within non-metallic materials is thus not a matter of molecule-to-adjacent-molecule energy transfer but rather a function of radiant wavelengths involved and the degree of the material's transparency. Radiations of shorter wavelengths may be absorbed and re-radiated several times in their passage from a material's center to its surface, while the rotational energy of its molecules and change of state give rise to long wavelength radiations which can exit directly.

Sensible heat emission from cooling organic products takes place largely from the surface layers at the shorter infrared wavelengths to which the material possesses little transparency, hence the Stefan-Boltzmann formula for radiant heat transfer holds fairly well. There is, however, a factor of molecular vibrational energy which can be emitted only at the ultra-long infrared wavelengths (100 to 400 micron) for which the material has a high degree of transparency, and this radiant emission is related to material depth as well as surface area.

With the emission of latent heat of change of state a quite different situation exists. This heat is of electron origin and is emitted directly at ultra-long infrared wavelengths as the material changes from the liquid state into the fixed lattice crystalline structure of a solid with sharply restricted electron motion. These diathermy-type rays pass readily through most organic materials but are reflected back from metal surfaces unless such surfaces are carbon blackened. Even a bismuth-blacked metal surface will reflect back 40% of radiant heat a 10 micron wavelength and is almost completely reflective for the 100 to 400 micron wavelength radiations.

It is now obvious that the type of thermopile instrument usually used to detect and measure heat ray radiations cannot be thus applied where the radiations are being emitted at wavelengths above 50 microns, since their radiant receiving surfaces are customarily coated with bismuth black or cadmium black instead of carbon black. Thus the older teachings regarding application of the Stefan-Boltzmann law of surface radiations are no longer valid except for radiant emanations from metallic surfaces. With organic or non-metallic materials, longer wavelength emanations can exit by direct radiation from deep points of origin.

My invention relates to a system and process for applying these radiant heat transfer principles to the cooling or refrigeration of animal and human tissues, for the relief of fevered states and for therapeutic applications in various types of refrigeration therapy. The system and process comprises:

(a) A refrigerating source for the supplying of a cold circulating medium to the radiant-ray receiving plates.

(b) A circulating system for same.

(c) Carbon-blacked plate coils positioned and shaped for best reception of body radiant heat emanation, i.e., as a closed cabinet capable of receiving the whole body, or in a boot-like shape for the cooling of a limb, or in a flat or curved plate shape for more localized cooling of a circumscribed body surface.

(d) Dewpoint control equipment for supplying air across the exposed cold plate surfaces at dewpoint temperatures below the desired plate operating temperatures so as to prevent moisture or ice condensation on the cold plate surfaces.

It is difficult to comprehend why living tissue exposed to a carbon coated plate will give off infrared rays in the range of 100 to 400 microns which are absorbed by the plate when these same rays would be given off from the living tissue without the plate being in proximity to the living tissue. This is because, for example in a room, the ceiling and walls absorb and reemit the rays back to the living tissue at close to the same or an increased rate at which they are originally emitted and at the speed of light. Therefore there is not a sufficient minus temperature achieved in the living tissue by an emission at a sufficiently greater rate than the wall surface absorption and re-emission of the rays brings about. With a carbon coated cooling plate maintained at a sub-freezing temperature in proximity to the living tissue all radiation including rays in the 100 to 400 micron range are absorbed by the carbon coating of the cooling plate. This same carbon coating when cold emits no infrared rays in the range of 100 to 400 microns are absorbed by the electrons of the carbon atom and are not reemitted except at temperatures above 150° F. Thus there is a net loss of heat from the living tissue to the carbon black coating. With the shorter infrared radiations emitted from the surface layers of the warm tissue to the sub-freezing temperature of the carbon black plate there is also a net loss of tissue heat to the cold plate which is dependent upon the temperature gradient maintained between the tissue surface and the cold plate.

In the drawings:

FIGURE 1, I have illustrated diagrammatically cooling apparatus adapted for reducing the temperature in the leg of a human being by radiant heat removal.

FIGURE 2 is a diagrammatic sectional view along the lines 2—2 in FIGURE 1.

FIGURE 3 is an enlarged sectional view of a portion of FIGURE 2.

The cooling device is composed of a tube-in-strip sheet bent into rounded cylindrical shape. The cylindrical cooling plate 1 has circular tubes 2 formed integrally with the plate. The outside of the plate is covered with insulation 3. The inner surface of the tubes and sheet is coated with a carbon black paint coating 4 brushed or sprayed on. A coolant liquid is supplied to the tubes from a pipe 5 circulated through the tubes and withdrawn for recirculation through pipe 6.

A human leg is indicated at 7. Around the upper part of the leg a curtain 8 extends down to surround the leg. At the top of the cylinder a circular plate 9 of tube-in-strip material closes the opening in the cylinder being supplied with coolant liquid by the pipes 10 and withdrawn by the pipe 11.

To prevent clouding or icing over of the carbon black coating, I have shown a series of inlet and outlet air pipes generally indicated at 12, as disclosed in my application Serial No. 714,164 filed February 10, 1958, now Patent No. 2,971,350. The air currents are cooled and contain dehumidified air which prevents the depositing of moisture on the carbon blacked surfaces which would prevent the free absorption of the infrared rays of all wave lengths which are emitted from the human leg.

It will be understood that while I have suggested one type of absorber cooler particularly adapted for therapeutic cooling of the leg, various other shapes of apparatus may be designed such for example, as a cabinet in which the entire human body may be encased or particular shapes may be devised for cooling different animals. To avoid shock on a human being it is within the scope of my invention to pass a gently circulating current of warm air through the cooler—the current being insufficient to divert the forced currents which pass along the surfaces of the carbon black coating.

Having thus described my invention, what I claim as new and desire to secure by Letters Patent is:

A therapeutic treatment for reducing temperature within the body which consists in exposing the body to a carbon coated heat absorber and thereby causing ultra long radiant rays from a feverous portion within the body to penetrate the skin surface, to be absorbed by the heat absorber, and maintaining a predetermined temperature at the skin surface to avoid shock by passing warm air currents over the skin surfaces of the body through which the ultra long radiant rays pass.

References Cited in the file of this patent

UNITED STATES PATENTS

| | | |
|---|---|---|
| 1,753,828 | Greer et al. | Apr. 8, 1930 |
| 2,425,714 | Baer | Aug. 19, 1947 |
| 2,825,338 | Schnepf et al. | Mar. 4, 1958 |